United States Patent [19]
Skirha et al.

[11] Patent Number: 5,909,957
[45] Date of Patent: Jun. 8, 1999

[54] SEALED VEHICLE LAMP AND ASSEMBLY METHOD THEREFOR

[75] Inventors: Martin Dirk Skirha; Cliff George Ambler; William Alan Nyberg; Nicky Marion Bronnenberg; Kelly Joe Snyder, all of Anderson; Steven Roy Seybert, Pendleton, all of Ind.

[73] Assignee: Guide Corporation, Anderson, Ind.

[21] Appl. No.: 08/772,637

[22] Filed: Dec. 23, 1996

[51] Int. Cl.⁶ ..................................................... B60Q 1/04
[52] U.S. Cl. ........................... 362/546; 362/267; 362/310
[58] Field of Search .................................. 362/459, 520, 362/546, 267, 310, 311

[56] References Cited

U.S. PATENT DOCUMENTS 5,626,413  5/1997  Ferrell ...................................... 362/549
5,735,596  4/1998  Daumueller .............................. 362/267
5,765,942  6/1998  Shirai et al. ............................. 362/267

*Primary Examiner*—Stephen Husar
*Attorney, Agent, or Firm*—Ice Miller Donadio & Ryan; Jay G. Taylor; Brian T. Ster

[57] ABSTRACT

A vehicle lamp assembly has an opaque housing portion and a light transmissive lens portion. The housing includes a peripheral channel for accepting a sealing adhesive and a complementary peripheral tongue on the lens portion. The bottom of the channel is characterized by a plurality of energy directors which contact the tongue and are locally upset by a ultrasonic weld apparatus to provide local welding between the lens and housing. The local welding provides fixtureless retention of the respective parts during the curing of the sealing adhesive.

6 Claims, 5 Drawing Sheets

SEALED VEHICLE LAMP AND ASSEMBLY METHOD THEREFOR

TECHNICAL FIELD

The present invention is related to cojoining of adhesively bonded components.

BACKGROUND OF THE INVENTION

One of a variety of external automotive lighting assemblies is generally characterized by two main parts including a molded opaque rear portion or housing and a permanently attached molded light-transmissive cover or lens. Depending upon the functional requirements such as for example a headlamp, the housing may include one or more reflectors such as by metalization of a parabolic or semi-parabolic surface. The housing further includes one or more bulb access apertures, typically keyed for twist-lock assembly of bulb and socket therethrough. Such lighting assemblies are typically sealed or substantially sealed with a certain degree of moisture permeability provided for by vapor membranes. In any case, a desired feature of such lighting assemblies is an impervious seal between the lens and housing and between the housing and bulb sockets. The latter is accomplished such as by conventional O-ring type seals. The former is accomplished generally by a sealing adhesive at the lens to housing interface.

Modern lighting designs are often driven by the styling and aerodynamic requirements which typically share the common objective of providing lighting assemblies which are flush with body panels. Such requirements often translate into lighting assemblies which wrap corners of the vehicle such as, for example, a combined headlight and side marker light assembly.

Often times the differences in material composition and or the geometric differences between a housing and a lens result in geometrical mismatch of the lens to housing interface due to creep of the parts away from the respective molded shapes as the parts cool or set. In a mass production environment, molded lenses and housings are desirably expeditiously moved through a series of stations including directly from mold to an assembly station whereat the lens and housing are joined by an adhesive. This undesirably may result in an unsealed assembly at one or more points about the interface of the lens and housing as creep sets in to the parts before the adhesive fully cures. Creeping of component parts may vary depending upon the materials and processes used in the manufacturing thereof and is generally due to material stresses introduced in the process and/or thereafter as the component part cools from a high process temperature. Therefore, for some time after the fabrication of component parts, it is common for the parts to relax into an equilibrium state or position which is dimensionally different from the process formed shape. Such component parts prior to substantial relaxation may be referred to as green parts or green components. Such relaxation phenomena generally are more prevalent in parts which turn a significant radius.

Proposals for addressing the general problems discussed herein include additional clamping of the lens and housing until the adhesive has attained a permanent set. Such solution is generally undesirable as additional manufacturing handling and complexity is introduced. Another proposed solution is to fixture the parts, again until such time as the adhesive sets. This too undesirably adds process handling and is extremely capital intensive requiring a multiplicity of fixturing apparatus. Another proposed solution is to drive anchor pins, screws or other intrusive fastener through the respective lens and housing material thus providing a mechanical fastening system between the two parts. This is generally undesirable in as much as such fasteners may require additional vehicle installation clearance, requires additional parts and handling and may be cosmetically unappealing.

SUMMARY OF THE INVENTION

Therefore, the present invention seeks to improve upon the known solutions to the sealing problem between parts such as an automotive housing and lens due to dimensional creep.

An improved sealed vehicle lamp assembly includes a housing with peripheral channel, sealing adhesive within the peripheral channel and a lens having a complementary tongue disposed within the peripheral channel. Located at the base of the channel are a plurality of spaced apart energy directors. The energy directors are in contact with the tongue of the lens and welded thereto by application of ultrasonic energy.

A method of adhesively joining first and second component parts to one another in a desired relationship, and particularly green parts which are characterized by dimensional instability includes providing the component parts to be joined. A predetermined amount of adhesive is dispensed onto a predetermined portion of one of the parts whereat the other of the parts is to be interfaced. The other of the parts is then inserted into the adhesive in the desired orientation which is followed by application of ultrasonic energy to locally weld the two parts and thereby retain them in the desired relationship during curing of the adhesive.

Advantageously, the method of joining component parts provides a sealed automotive lighting assembly by joining a housing assembly and a lens assembly. The housing assembly is provided with a closed peripheral channel and the lens assembly is provided having a closed peripheral tongue substantially complementary to the closed peripheral channel. A bead of sealing adhesive is dispensed into the closed channel and the tongue is inserted into said channel. The channel and tongue are then ultrasonicly welded at predetermined locations.

Preferably, a plurality of energy directors are located at spaced part areas at the base of the channel and correspond to the desired weld locations.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
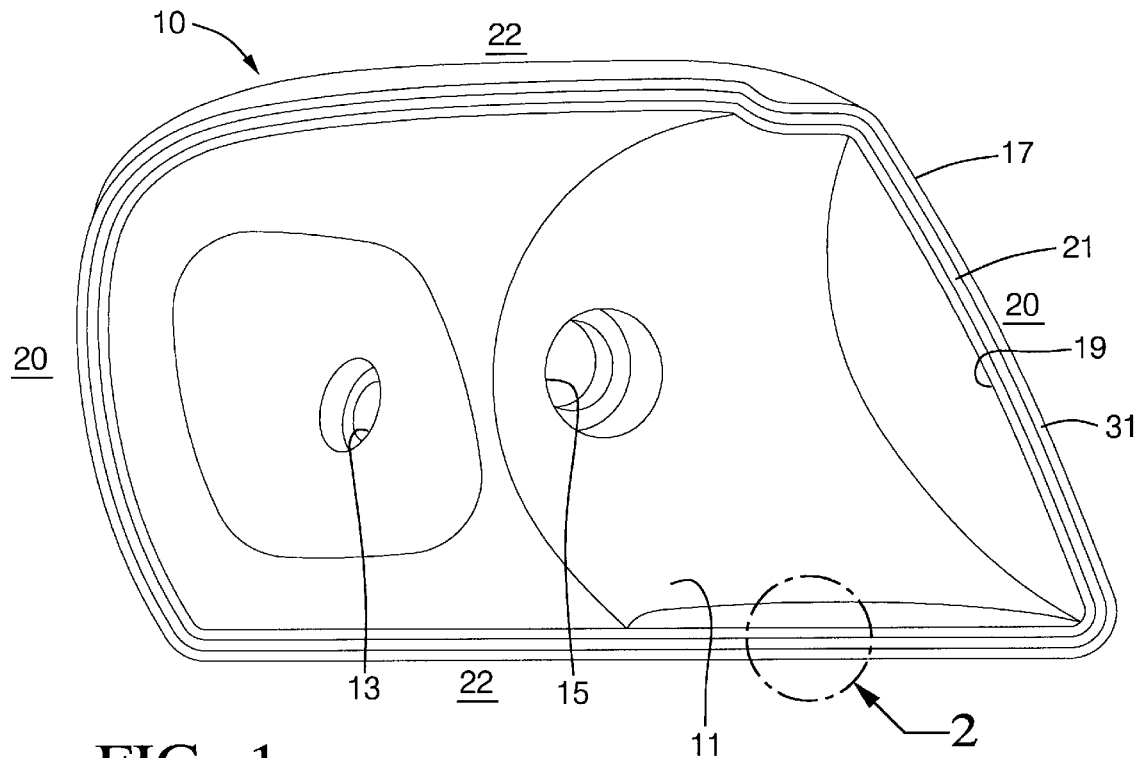
FIG. 1 illustrates a vehicle lighting assembly housing in accordance with the present invention.
Figure 2:
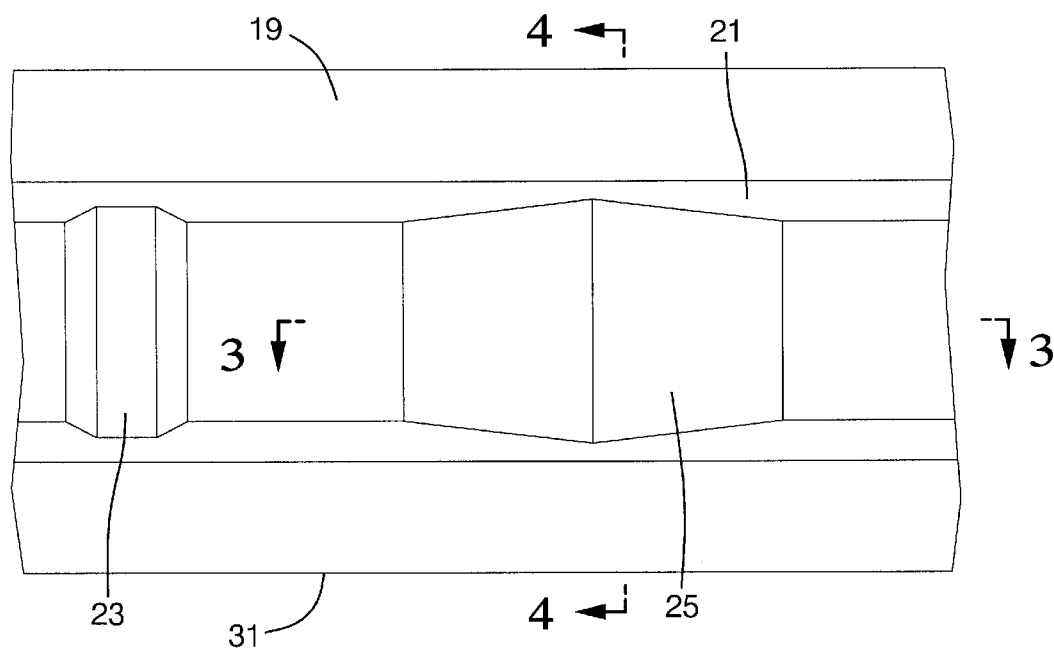
FIG. 2 illustrates a detailed plan view of the portion labeled FIG. 2 of the housing of FIG. 1.
Figure 3:
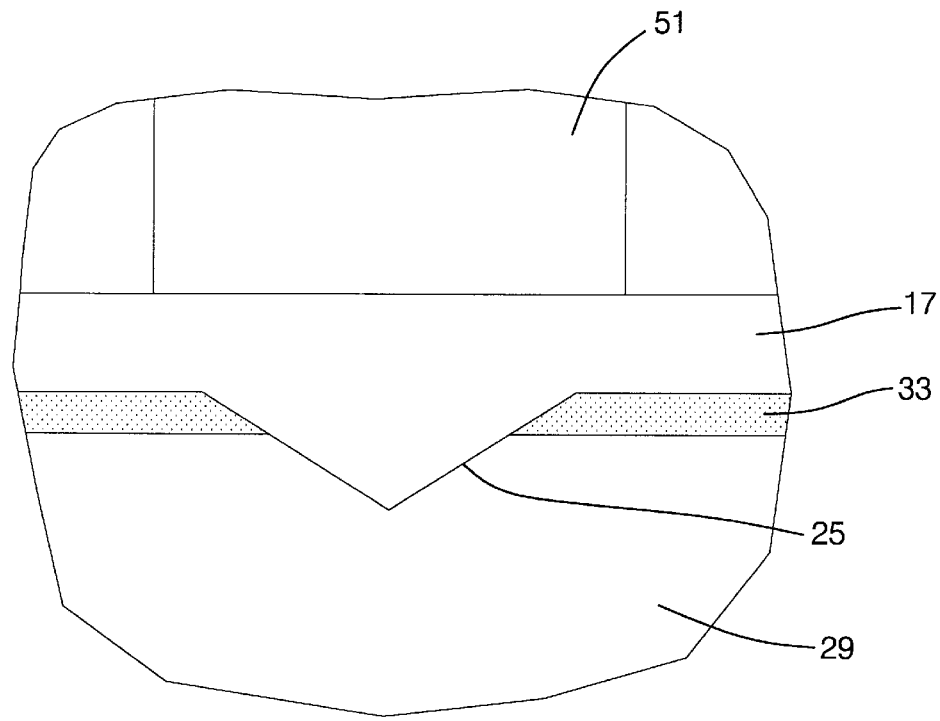
FIG. 3 illustrates a section of the housing taken through line 3—3 of FIG. 2.
Figure 4:
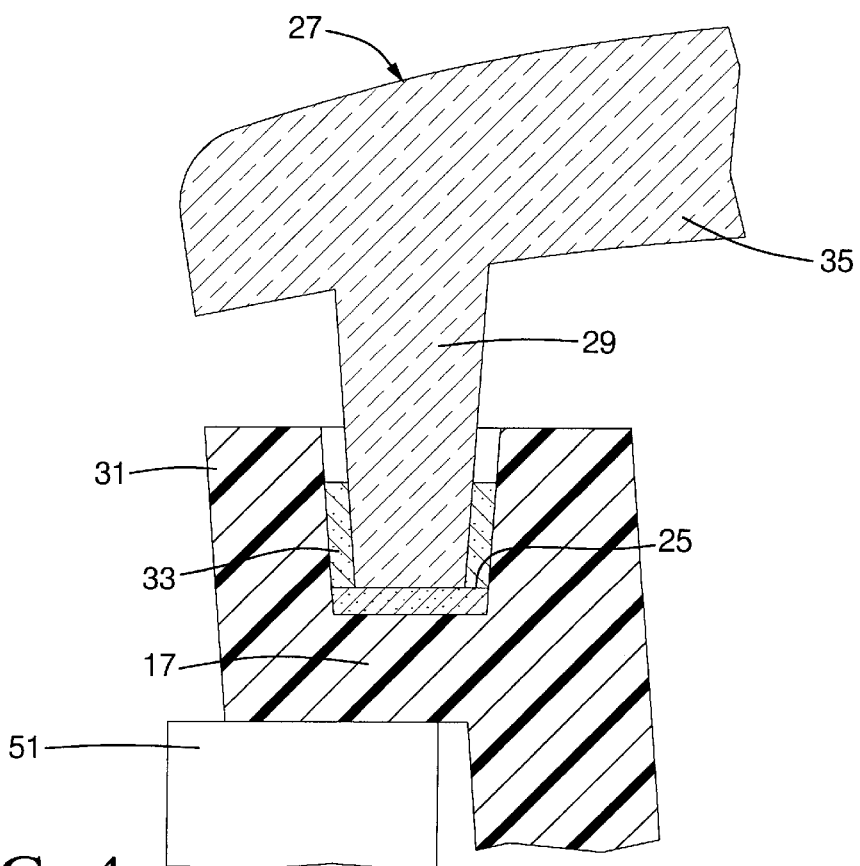
FIG. 4 illustrates a section of the housing taken through line 4—4 of FIG. 3.

With reference to the appended drawings, designating numerals which appear in more than one of the figures correspond to like features between the various views. FIG. 1 generally illustrates a vehicle lamp housing assembly 10 which provides for park turn and side marker light functionality. FIGS. 2 through 4 provide additional detail helpful in understanding the general description of the housing and lens of the light assembly as well as various features of the present invention to be detailed later. The view of FIG. 1 is generally representative of a view at an angle outboard of the center line of the vehicle on the passenger side thereof while the views of FIGS. 2 through 4 are representative of various detailed and sectional views of, or through, selected portions of the housing. The portion of the housing assembly 10 to the right in FIG. 1 is associated with the provision of a substantially forwardly projected park turn light beam while the portion of the housing assembly 10 to the left in FIG. 1 is associated with the provision of a substantially side facing side marker lamp.

The park turn portion of the housing assembly 10 includes a reflector 11 which conventionally is provided for by a metalization layer on a parabolic or semi-parabolic portion of the housing. The housing 10 may be comprised of, for example, a conventional polycarbonate material fabricated by known injection molding processes. A park turn bulb socket key-way 15 is provided at the base of the parabolic headlight reflector 11 for assembly of a bulb and bulb socket (not shown) through the posterior of the housing. In spaced adjacency to the park turn portion and off-axis thereto is a side marker bulb socket key-way 13. The entire housing assembly 10 generally turns a radius which sweeps the housing assembly around the front corner of the vehicle such that the park turn portion generally projects forward of the vehicle and the side marker lamp portion is generally most visible from a side viewing angle relative to the vehicle.

The housing 10 has associated therewith sidewall 19 generally delimiting the housing. A flange 17 extends outward from the housing 10 from the sidewall and somewhat below the terminal end of the sidewall. An outer channel wall 31 extends forwardly from the flange 17 to cooperatively, with the terminal end of sidewall 19, form housing channel 21. FIG. 4 is generally illustrative of the housing channel 21 and various features of the housing contributing to the housing structure as described. The channel 21 so provided runs about the entire perimeter or periphery of the housing 10. Generally, the shorter runs of channel 21 are labeled 20 and the longer runs of channel 21 are labeled 22 and may be referred to as the longitudinal channels.

Lens assembly 27 comprises a light-transmissive lens cover 35 generally following the contour of the housing 10 and continuous lens tongue 29 extending therefrom and complementary to the channel 21 of housing 10 for acceptance therein. An important aspect of the present embodiment wherein a seal is desired at all places between the tongue and channel, the tongue is formed as an unbroken loop substantially about the periphery of the lens assembly. The lens assembly may be comprised of, for example, an acrylic material fabricated by known injection molding processes.

In accordance with the present invention, a plurality of lens stops 23 are provided at spaced apart locations within the channel 21 to provide for maximum invasion of the lens tongue 29 into the channel 21 thus desirably providing an adhesive pocket between the channel floor and distal end of the lens tongue 29. Also provided are a plurality of energy directors 25 which rise from the channel floor at a relatively wide base to a peak running substantially normal the channel major axis from the sidewall 19 to the outer channel wall 31. The pre-fabricated or virgin height of the energy directors 25 is greater than the height of the lens stops 23. Therefore, upon the assembly of the lens assembly 27 to the housing 10, the lens tongue 29 rests upon the plurality of energy directors 25. The energy directors 25 are preferably distributed symmetrically although may be provided in any areas of the channel where a ultrasonic tack weld is desired. In the present embodiment, four such energy directors are provided—two toward the extreme ends of each longitudinal channel 22. Also in the present exemplary embodiment, the stops 23 have a nominal height from the floor of the channel 21 of 0.8 mm and the energy directors have a nominal height of 1.5 mm. The minimum on center spacing between an energy director 25 and a stop 23 must be sufficient to avoid any upset of the stop during the ultrasonic weld process. A minimum nominal distance of 25.0 mm in the present exemplary embodiment returns satisfactory results in this regard.

Figure 5:
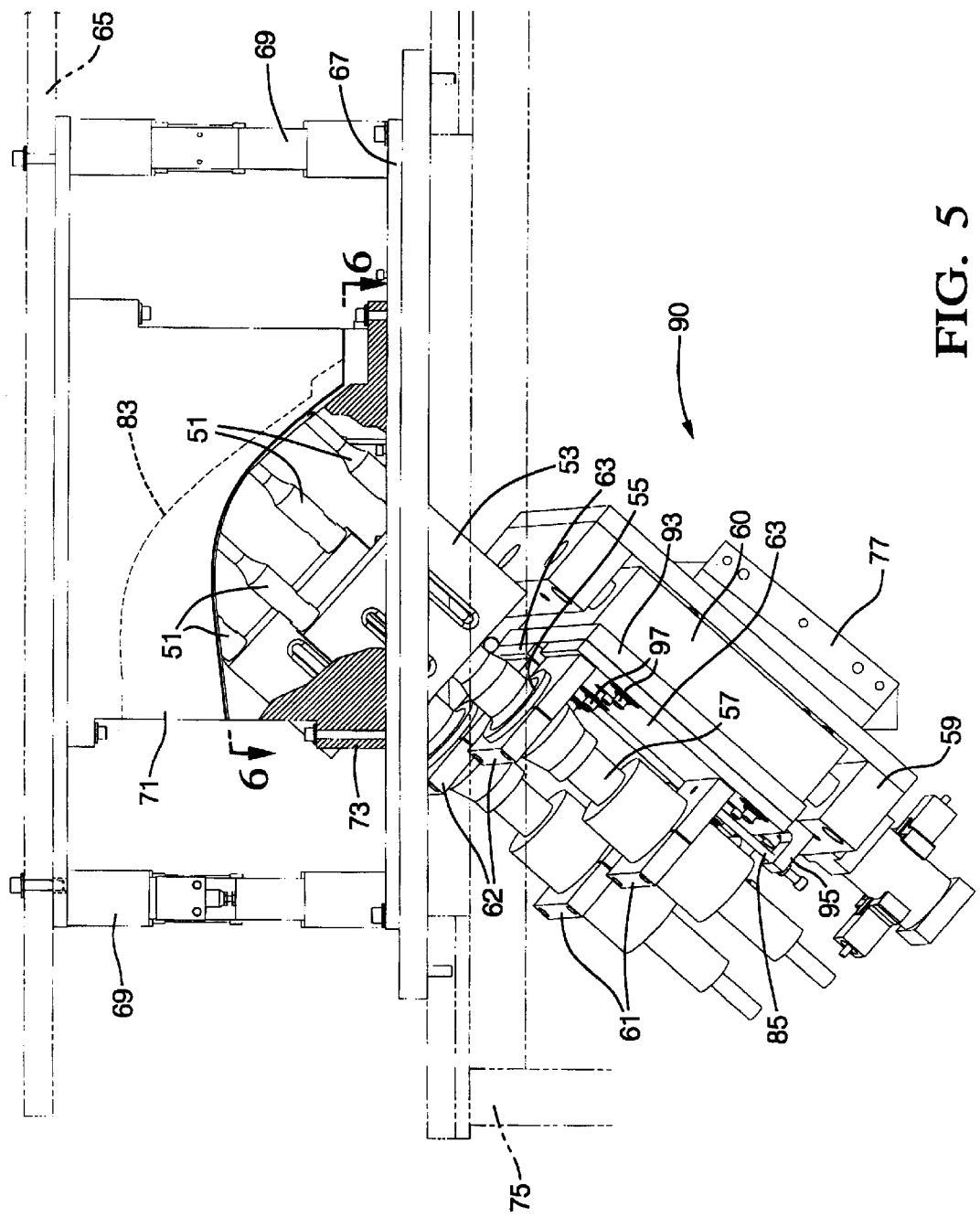
FIG. 5 illustrates a view of an ultrasonic welding apparatus and fixture in accordance with carrying out the present invention.

With the basic structure of the exemplary lighting assembly having been described, exemplary processing equipment related thereto may now be described. Additional reference is made to FIGS. 5 and 6 which illustrate an exemplary ultrasonic welding apparatus and fixture in accordance with the present invention. FIG. 5 is illustrative of a side view of the ultrasonic welding apparatus and fixture with certain features removed, others sectioned and yet others illustrated as surfaces as to be described. First, a fixture base 75 is generally associated with a process manufacturing station whereat light assemblies of the variety described are sequentially accepted, assembled and passed on in a continuous mass production part processing operation. Fixture 75 has associated therewith and fixable attached thereto a static lower clamp plate 67. Lower clamp plate 67 is coupled by a plurality of guide pins to a dynamic upper clamp plate 65. Upper clamp plate 65 is adapted to move up and down in accordance with a linear actuator (not shown) such as for example an overhead pneumatic cylinder. The upper clamp plate 65 is illustrated in the full down or closed position. Fixably attached to the lower clamp plate 67 is a housing clamping nest 73, portions of which are shown in cross hatched sections. The remaining portions of the housing clamping nest is cut-away all the way up to the parting line labeled 6. Visible in the view of FIG. 5, therefore, are portions of a ultrasonic weld apparatus 90. In immediate adjacency to the housing clamping nest 73 above the parting line 6 is a lens clamping nest 71. Lens clamping nest is fixably attached to the upper clamping plate 65 and travels in unison therewith. Lens clamping nest 71 is generally illustrated as a solid surface excepting a lens profile line 83 generally illustrative of the surface profile of the lens assembly therein. It is not envisioned that a lens assembly 27 actually be loaded for retention into the lens clamping nest for the purposes of accomplishing the present invention. Therefore, the critical dimensions of the lens clamping nest are generally those in perimeter contact with the lens assembly 27 proximate to the lens tongue 29. The remaining lens clamping nest surfaces may be opened up such that they do not or only minimally contact the surface of the light transmissive lens cover 35 to avoid undesirable witness marks or contamination thereof.

Figure 6:
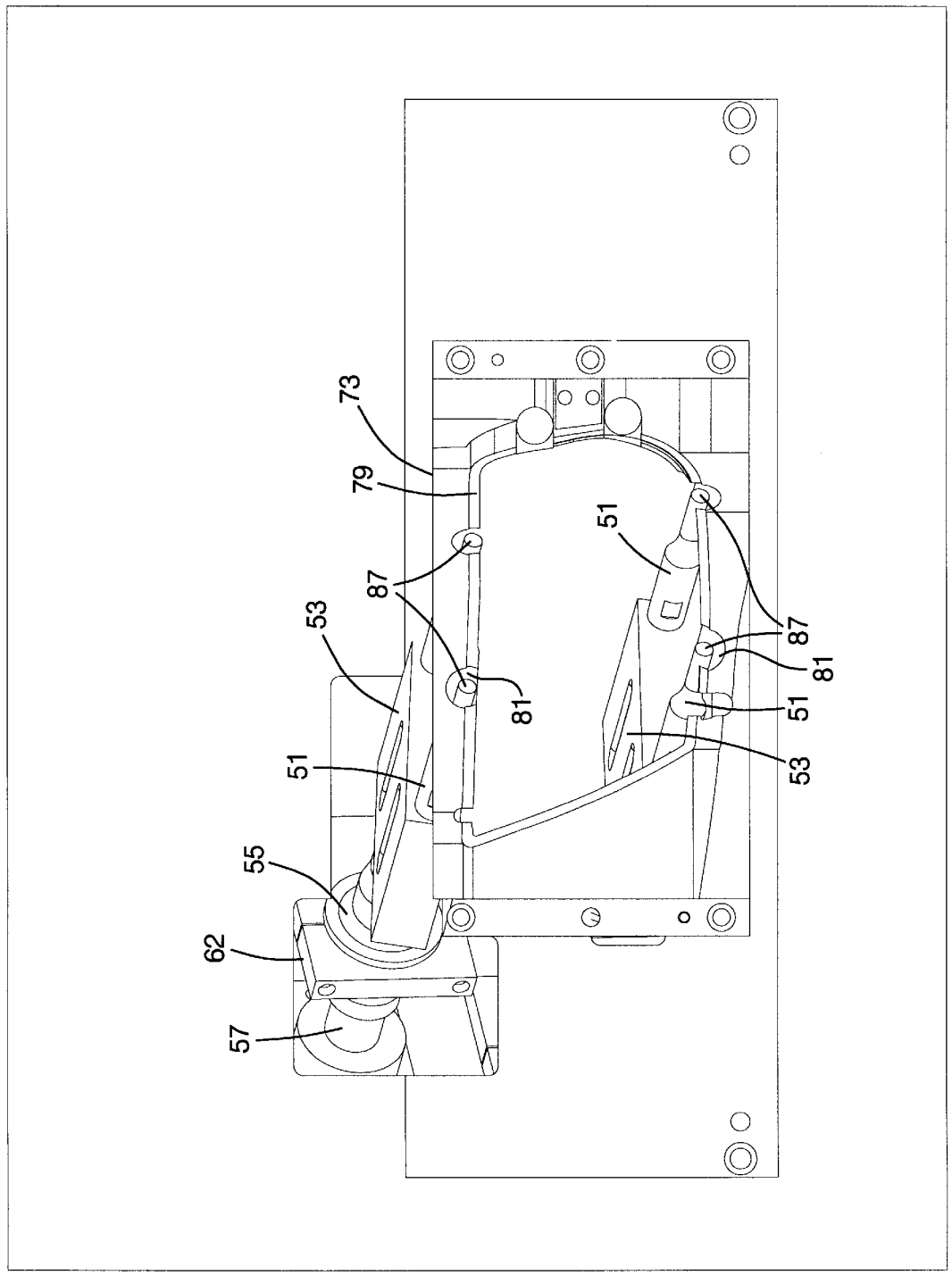
FIG. 6 illustrates view of an ultrasonic welding apparatus and fixture taken along line 6—6 of FIG. 5.

With specific reference to FIG. 6, a surface profile view taken along the parting line 6 of FIG. 5 illustrates the functionality and nature of the housing clamping nest 73. The contour of the underside of the flange 17 is complementarily reproduced in the housing clamping nest 73. The housing clamping nest is generally open in the central portion as exhibited by the portions of the ultrasonic welding apparatus visible therethrough. A flange ledge 79 is matched with the underside of the ledge 17 of the housing assembly 10 which itself is not separately illustrated in FIG. 6 for clarity. A housing assembly may therefore be accommodated in the housing clamping nest 73 and retained merely by the complementary ledge 79 and flange 17 without the necessity of additional fixturing or retention apparatus. Located about the flange ledge 79 are a plurality of ultrasonic weld horn tips which are provided access through the housing clamping nest by way of a corresponding plurality of access passages 81. The plurality of weld horn tips 87 correspond in number and location to the plurality of energy directors located in the channel 21 of the housing 10 as described.

Ultrasonic welding apparatus is generally designated by the reference numeral 90 in FIG. 5 and includes structural mount 77 which is fixably coupled to the fixture 75 by a pair of arms (not shown) generally extending downwardly from a structural portion of the fixture 75. Attached to the mount 77 is a pneumatic cylinder mounting 59 itself engaged to an air slide assembly 60 which is free to move unencumbered by the mounting 59. Set plate 93 is fixably coupled to air slide assembly 60 by way of adjusting pin brackets 95, only one of which is visible in the view. Set plate 93 move with air slide assembly 60. On top of set plate 93 is a pair of adjustable slide plates 63 which may be moved fore and aft on set plate 93 by way of threaded adjusting pins 85—only one of which is shown—cooperating with adjusting pin brackets 95 and lower brackets 61 which are fixed to respective slide plates 63. Once a relative travel setting is established by the adjusting pins 85, relative motion between the slide plates 63 and air slide assembly 60 is eliminated by torqueing a plurality of set bolts 97 securing slide plates 63 to set plate 93. Thereafter, the air slide cylinder assembly and cylinder housing cooperatively provide for engagement and disengagement positioning of the weld horns as described later.

Slide plate 63 additionally provides mounting provisions such as upper and lower mounting brackets which clamp the ultrasonic generating apparatus to the fixturing heretofore described. In the present embodiment, a pair of such ultrasonic welding apparatus are provided and the description with respect to one will be taken to apply equally to the other. Firstly, a lower clamp 61 secures a converter stage 57 which may be a conventional low amplitude, low energy piezoelectric vibrator. The converter stage is coupled to booster stage 55 which applies a desired gain to the converter stage. Booster stage couples its output to a mother horn 53 which in tune is coupled to a pair of weld horns 51. As previously mentioned, each weld horn has associated therewith a respective weld horn tip 87 visible in the view of FIG. 6.

Figure 7:
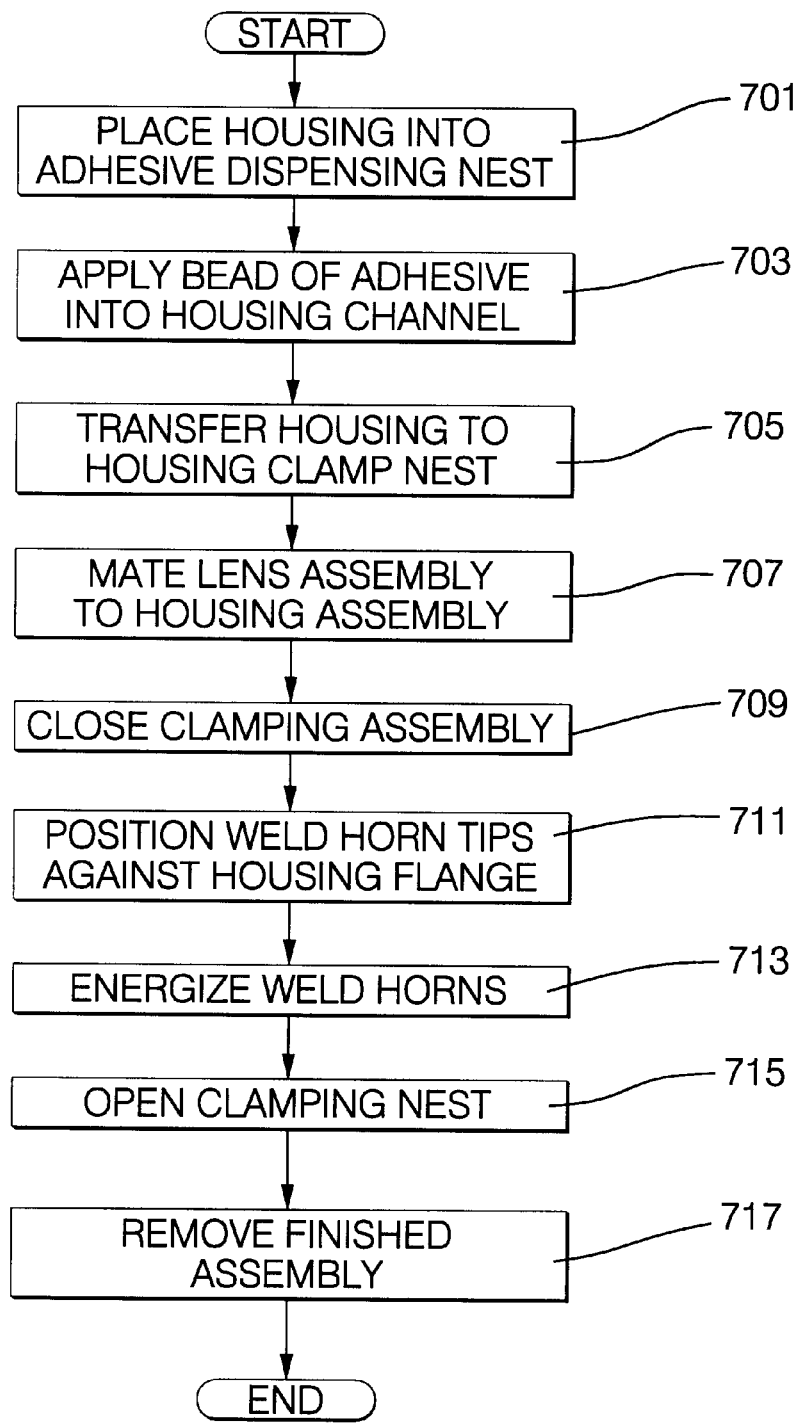
FIG. 7 illustrates exemplary process flow steps for carrying out the present invention.

Exemplary process flow steps illustrated in FIG. 7 for carrying out the present invention are now described. First, at steps 701 and 703, a housing assembly 10 is provided to a station whereat a sealing adhesive 33, such as a hot melt urethane, is controllably dispensed as a closed bead within the channel 21. That is to say, the bead of adhesive starts and ends at the same point to provide an unbroken, continuous and closed loop of adhesive. The steps are preferably accomplished by placing the housing 10 into a dedicated adhesive dispensing nest such that the channel opening is substantially up and the urethane adhesive 33 is readily retained therein. Providing a dedicated nest for the adhesive dispensing step reduces the likelihood of contamination of the housing clamping nest 73. The housing 10 is next removed from the dispensing nest and transferred to the housing clamping nest 73 in an open clamping fixture characterized by a fully retracted overhead pneumatic cylinder at step 705. Next, at step 707, the lens assembly 27 is mated to the housing assembly 10 such that the tongue 29 is within the channel 21. The overhead pneumatic cylinder is then actuated at step 709 to gently bring the lens clamping nest down into contact with the lens assembly 27 thereby engaging the tongue 29 into the adhesive 33 only to the depth limited by the energy directors. The weld horn tips 87 are then brought into contact with the underside of flange 17 of the housing assembly 10 at step 711. This is accomplished by controlled actuation of the air slide assembly 60 into an engaged position. With the weld horn so placed, the converter and booster are energized at step 713 for a predetermined duration and energy level profile sufficient to provide localized housing to lens tack welds at each of the energy director locations. It is here noted that as the weld energy caused the material to be locally upset, the lens assembly 27 compresses further into the adhesive 33 within the channel until the tongue reaches the lens stops 23. In the present example, a 20 kHz weld apparatus is employed though other available nominal frequency apparatus may be substituted. Generally, the generatable amplitude of a 20 kHz weld apparatus is substantially between 30 and 120 microns. In the present example, 65 to 100 microns has provided satisfactory weld result. The welding process duration in the present example is substantially 3.0 seconds though this parameter, like the others, may vary significantly from application to application. The weld horns are then backed off of the flange 17 by reversing or exhausting the air slide assembly 60. The clamping fixture is then opened by reversing or exhausting the overhead pneumatic cylinder at step 715. A completed lighting assembly may then be removed at step 717 from the housing clamping nest.

The present invention has been described with respect to processing green components which relax during the curing process of the sealing adhesive. However, the process is equally applicable to joinder of already relaxed component parts.

While the present invention has been described with respect to a particular application and exemplary embodiment, such is offered by way of non-limiting example of the invention. It is anticipated that a variety of modifications and changes will be apparent to those having ordinary skill in the art and that such modifications and changes are intended to be encompassed within the scope of the invention as defined in the appended claims.

We claim:

1. A method of sealing an automotive lighting assembly between a housing assembly and a lens assembly thereof, comprising the steps:

providing a housing assembly having a closed peripheral channel;

providing a lens assembly having a closed peripheral tongue substantially complementary to said closed peripheral channel;

dispensing a closed bead of sealing adhesive into the closed peripheral channel;

inserting said tongue into said channel; and, ultrasonic welding said channel and tongue at predetermined locations;

whereby said housing and lens assemblies are retained in a desired relationship while the sealing adhesive cures.

2. The method of sealing as claimed in claim 1 further comprising the steps:

clamping the housing assembly and lens assembly to compress the tongue into the adhesive prior to the step of ultrasonic welding; and unclamping the housing and lens assemblies subsequent to the step of ultrasonic welding.

3. The method of sealing as claimed in claim 1 wherein at least one of said housing assembly and lens assembly is provided in a substantially unrelaxed state.

4. The method of sealing as claimed in claim 3 wherein said housing assembly is formed from injection molded polycarbonate.

5. The method of sealing as claimed in claim 3 wherein said lens assembly is formed from injection molded acrylic.

6. An improved sealed vehicle lamp assembly including a housing with peripheral channel, sealing adhesive within the peripheral channel and a lens assembly having a tongue disposed within the peripheral channel, the improvement comprising:

a plurality of spaced apart energy directors located at the bottom of the peripheral channel and in contact with the tongue of said lens assembly, said energy directors and said tongue having been sufficiently upset by an external ultrasonic energy source to have caused local welding between the tongue and energy directors.

* * * * *